(12) United States Patent
Godbout et al.

(10) Patent No.: US 6,782,147 B2
(45) Date of Patent: Aug. 24, 2004

(54) OPTICAL PHASE SHIFTING, SPLITTING AND COMBINING DEVICE

(75) Inventors: Nicolas Godbout, Montreal (CA); Nelson Vachon, Mascouche (CA)

(73) Assignees: ITF Technologies Optiques Inc.; ITF Optical Technologies Inc., Ville St-Laurent (CA)

( * ) Notice: Subject to any disclaimer, the term of this patent is extended or adjusted under 35 U.S.C. 154(b) by 201 days.

(21) Appl. No.: 10/090,128

(22) Filed: Mar. 5, 2002

(65) Prior Publication Data

US 2003/0063834 A1 Apr. 3, 2003

(30) Foreign Application Priority Data

Sep. 28, 2001 (CA) .............................................. 2357991

(51) Int. Cl.[7] .................................................. G02B 6/00
(52) U.S. Cl. ................................. 385/11; 385/3; 385/27
(58) Field of Search .............................. 385/3, 11, 17, 385/27, 87; 65/403

(56) References Cited

U.S. PATENT DOCUMENTS

| | | | |
|---|---|---|---|
| 4,274,854 A | * 6/1981 | Pleibel et al. | 65/403 |
| 5,078,511 A | * 1/1992 | Noll et al. | 385/3 |
| 5,293,436 A | 3/1994 | Diemeer | 385/11 |
| 5,317,384 A | 5/1994 | King | 356/351 |
| 5,572,611 A | * 11/1996 | Jinguji et al. | 385/17 |
| 5,611,005 A | 3/1997 | Heismann et al. | 385/11 |
| 5,703,975 A | 12/1997 | Miller et al. | 385/16 |
| 5,708,734 A | 1/1998 | Van Der Tol | 385/11 |
| 5,943,453 A | 8/1999 | Hodgson | 385/16 |
| 5,943,458 A | 8/1999 | Miller | 385/39 |
| 5,946,432 A | * 8/1999 | Keck et al. | 385/27 |
| 6,128,422 A | 10/2000 | Hodgson | 385/11 |
| 6,175,668 B1 | 1/2001 | Borrelli et al. | 385/11 |
| 6,240,221 B1 | 5/2001 | Thompson | 385/14 |
| 6,441,934 B1 | * 8/2002 | Boord et al. | 398/87 |

FOREIGN PATENT DOCUMENTS

EP          0562695          6/1997          ........... G02F/1/225

* cited by examiner

*Primary Examiner*—Ellen E. Kim
(74) *Attorney, Agent, or Firm*—Louis Tessier; George J. Primak (57) ABSTRACT

A Mach-Zehnder device including an input port, an output port, a substantially achromatic first coupling region optically connected to the input port and a substantially achromatic second coupling region optically connected to the output port. An intermediate region is optically connected to the first and second coupling regions. The intermediate region includes a first intermediate branch and a second intermediate branch. The first intermediate branch defines a phase shifting portion. The phase shifting portion, in turn, defines a phase shifting portion level of birefringence over the length of the phase shifting portion. The phase shifting portion level of birefringence is different that the level of birefringence prevailing over the remainder of the first intermediate branch. The birefringence differential between the phase shifting portion level of birefringence and the level of birefringence prevailing over the remainder of the first intermediate branch creates a polarization selective phase shift enabling the generally wavelength insensitive device to be used either as a coupler or splitter.

27 Claims, 3 Drawing Sheets

OPTICAL PHASE SHIFTING, SPLITTING AND COMBINING DEVICE

FIELD OF THE INVENTION

The present invention relates to the field of optical devices and is particularly concerned with a polarization selective phase shifting, splitting and combining optical device.

BACKGROUND OF THE INVENTION

Optical fibers are becoming an increasingly popular data transmission medium since they are believed to be ideally suited to the requirements of high-speed communication networks. Some of the desirable characteristics of optical fiber networks are that they transmit signals over relatively long distances with relatively low signal losses and at relatively high rates. Fiber bandwidth is thus a critical characteristic of optical fiber networks since fiber bandwidth is directly related to the information carrying capacity of a fiber and limits the maximum rate at which information can be transmitted.

The search for higher bandwidth has resulted in the deployment of improved optical transmission systems. These high-speed networks have brought new challenges to the optical components industry. Optical phenomena, which have had negligible effects on system performance in the past, are now of utmost importance. Polarization is a common factor in a number of such phenomena that must be characterized if these high-bandwidth systems are to meet, and perhaps exceed, their potential.

As is well known in the art, the polarization of light is determined by the time course of the direction of the electric-field vector. For monochromatic light, the three components of the electric-field vector vary sinusoidally with time with amplitudes and phases that are generally different, so that at each position the endpoint of the vector moves in a plane and traces an ellipse. The plane, the orientation and the shape of the ellipse vary with position.

In paraxial optics, however, light propagates along directions that lie within a narrow cone centered about the optical axis. Waves are approximately transverse electromagnetic and the electric-field vector therefore lies approximately in the transverse plane. A polarized light signal can thus be divided between an x axis polarization component and an orthogonal y axis polarization component.

In instances wherein one of the polarization components is zero or wherein both polarization components are in phase, then the light signal is said to be linearly polarized and can be represented by a simple vector that has a given amplitude and a given angle relative to the reference axes. If the two polarization components are of same amplitude but out of phase relative to each other, then the polarization state is said to be circular. If the two polarization components are of different amplitude and phase, the polarization is said to be elliptical.

In modern fiber optic telecommunications, the polarization of the signal is typically used to help direct the signal along the fiber optic network. Network components or devices which function based upon the polarization of the light signal include polarization division multiplexers, polarizers, depolarizers, fiber optic polarization tunable filters, binary polarization switch/modulators, and many other polarization related fiber optic components. All of these devices require fiber optic variable polarization beam splitters and/or combiners that are adapted to either split a light signal into two orthogonal linearly polarized signals or to combine optical signals by reversing their paths in the device.

Polarization beam splitters and/or combiners are not only used as part of other optical components but are also used alone or in combination with other optical devices in a variety of situations. For example, polarization beam combiners may prove to be particularly useful in the context of signal amplification. Although modern fibers have very low losses per unit length, signal amplification is an important element of many optical information networks. Indeed, long fiber spans, for example, cables extending from one city to another, require periodic amplification of the transmitted signal to ensure accurate reception at the receiver.

Erbium doped fiber amplifiers have been developed to satisfy this need for signal amplification. Such amplifiers consist of a length of optical waveguide fiber, typically 5 to 30 meters of fiber, which has been doped with erbium. The quantum mechanical structure of erbium ions in a glass matrix allows for stimulated emission in the approximately 1520 to 1620 nanometer range, which is one of the ranges in which optical waveguide fibers composed of silica exhibit low loss. As a result of such stimulated emission, a weak input signal can achieve more than a hundred fold amplification as it passes through a fiber amplifier.

To achieve such stimulated emission, the erbium ions must be pumped into an excited electronic state. Such pumping can take place in various pump bands. Combining/splitting devices are an integral part of the amplification process being used along with semiconductor laser sources and wavelength multiplexing devices for generating a pumping signal.

One common method of producing a polarization splitter involves the use of a birefringent crystal. The splitter works by taking advantage of the anisotropic structure of this crystal; that is, the crystal does not have the same optical density for the two transverse propagation vectors.

When a randomly polarized signal is passed through a crystal of this kind the polarization is broken up into two components relative to the optical orientation of the crystal. Both beams will emerge linearly polarized, but with polarization orientations perpendicular to each other.

Only certain types of crystals will exhibit birefringent behavior. Crystals must have hexagonal, tetragonal, or trigonal lattice structures to allow the light to encounter an asymmetric structure. Some common materials with these characteristics are calcite (calcium carbonate), quartz, and tourmaline. There are many ways to make a beam splitter cube from these materials, the most common being slicing a rectangular prism of the material along a diagonal, and cementing it back together in a different orientation.

Some devices have gain widespread acceptance despite their numerous drawbacks. The Glan-Thompson polarizer, for example, includes a block of birefringent material cut into prisms and then cemented together. It reflects one polarization component at the cement interface and transmits the other. The device suffers from requiring a considerable amount of birefringent material, generally calcite, which is scarce and expensive. It is also unable to work with high-powered lasers and ultraviolet light, since the light destroys or clouds cement. Furthermore, this beam splitter, which makes use of the reflected polarization component, suffers from the added disadvantage that polarized beams exit the device at inconvenient angles, for example 45 degrees, when it is often useful that beams are parallel, orthogonal or otherwise oriented.

The Glan-Taylor polarizer, which is similar to the Glan-Thompson polarizer but uses an air space instead of cement to separate polarization components, can work with many light sources but suffers from reflection loss and ghosting caused by the air gap. The Wollaston, Rochon and Senarmont beam splitters, which separates polarization components by transmitting the components through an interface, permit optical contacting for use with most light sources, but produce beams which also exit at inconvenient angles, with one or both polarization components suffering from chromatism and distortion.

The double refracting element that produces parallel-polarized beams of light, achieves small beam separation and limited field. Also, since the beams may pass through a considerable amount of material before achieving useful separation, wavefront distortion can occur in the extraordinary beam due to imperfections in the crystal's structure. Beam separation can be further limited by the small size and high cost of suitable crystals.

Other types of known polarization beam splitters and combiners make use of semiconductors. These types of devices also suffer from serious drawbacks. For example, an integrated optical polarization beam splitter using $LiNbO_3$ or semiconductor substrates presents the shortcomings of high insertion loss, poor polarization extinction ratios and limited operational spectral bandwidth.

Yet, other types of known polarization beam splitters and combiners make use of so-called polarization-maintaining fibers. As the name implies, these fibers permit light to pass through them while preserving its polarization state. The term is used to distinguish these fibers from conventional so-called single-mode fibers. As is well known, despite the accepted terminology, single-mode fibers actually propagate two modes, one of each polarization.

If the fiber has a perfect circular geometry and symmetry of its index profile, the two polarization modes travel in the same way and behave as a single-mode. Ideally this means that the fiber must have perfect geometry and be completely symmetrical along the optical axis. It must also be homogeneous along the axis. Such fibers are referred to as low birefringence fibers. In such fibers, any polarization launched into the fiber travels relatively undisturbed, with very little distortion along the fiber and the polarization at the output is substantially identical to that at the input.

Most practical single-mode fibers, however, are not perfect, and even if they were, bending them for example when packaging into cables disrupts their perfect characteristics. Consequently, the two polarization modes in standard single-mode fibers typically travel at slightly different speeds and, hence, arrive at different times at the output. This imposes a form of pulse spreading or bandwidth limitation known as Polarization Mode Dispersion (PMD).

In addition to the two polarization modes arriving at different times, polarized light launched into standard single-mode fibers is not preserved. Instead, it quickly becomes arbitrary and unpredictable at the output. This behavior arises because temperature fluctuations and external forces both perturb the fiber's geometry and index of refraction, thereby affecting the two polarization modes in different ways. This, in turn, leads to instability in the fiber's PMD and state of polarization.

To overcome the variable polarization, Polarization Maintaining (PM) fibers have been developed. Since it seems realistically futile to attempt manufacturing a perfectly cylindrical fiber immune to external forces, fiber manufacturers make PM fibers by taking the opposite extreme of deliberately destroying the fiber's circular symmetry. A different geometry or index of refraction on the fiber's x and y axes produces an optical loss or velocity much higher on one axis than the other. If the loss of one polarization mode is much higher than the other, the fiber is a true single-mode, single-polarization fiber. Such fibers, however, are not commercially available.

More common are so-called birefringent fibers in which the phase velocity of one polarization mode is much higher than the other. The internal stresses in these fibers are greater than those commonly encountered from external forces. Consequently, the propagating light is little affected by the external forces and almost no power exchanges between the two polarization modes. Typically, standard single-mode fibers have low birefringence, and good commercial PM fibers have high birefringence.

Depending on how light is launched into a birefringent fiber, the state of polarization will either stay the same or vary with distance along the fiber. The amount of power coupled into the unwanted mode is called the Extinction Ratio (ER) and can be used as a measure of the polarization holding ability of a PM fiber. It is defined as $ER(dB)=-10 \log (P_U/P_E)$ where $P_U$ is the power at the output in the initially unexcited mode and $P_E$ is the power at the output in the excited mode.

If linearly polarized light is not launched exclusively onto either axis, some power propagates in both polarization modes and the phase between the two evolves and periodically returns to its original state. The length of fiber required for the two modes to return to the initial state is the fiber's beat length. Beat length is a direct measure of birefringence. Hence, fibers having short beat lengths are said to have high birefringence.

Birefringent fibers can be manufactured by deliberately making the fiber asymmetrical in shape or in stress. Because it's difficult to obtain strong birefringence using only shape variation, most commercial PM fibers achieve most of their birefringence by relying on asymmetrical internal stresses to preferentially change the index of refraction along each axis. This is done by using materials that have different expansion coefficients, and by using an asymmetrical geometry to induce asymmetrical stresses.

In accordance with one method of manufacturing, birefringence is achieved by starting with a preform composed of four regions: a geranium-doped core with a silica clad, two aluminum doped stress rods, six silica rods and a silica tube that encapsulates everything.

Drawing the preform into a fiber at low tensions merges the various materials causing the aluminum-doped stress rods to take the shape of two fan blades. The different thermal expansion coefficient of the stress rods causes large internal stresses in the fiber producing its polarization holding properties. In accordance with another manufacturing method the polarization maintaining fiber achieves internal stresses by using a stress cladding whose thickness varies along two perpendicular axes.

During the process, a circular preform is squeezed into a rectangular shape that is then drawn into a rectangular fiber. As the fiber cools, the different thermal contractions induce internal stresses that coincide with the principal axes of the rectangular shape. The fiber's rectangular shape provides a geometrical reference that can be used for splicing fibers together. Because it's important when splicing PM fibers to align not only their cores but also their polarization axes, the fiber's rectangular geometry enables accurate alignment without the need for monitoring with elaborate equipment.

A variation on the rotary splice allows the fiber to be either passively or actively aligned.

While polarization maintaining fibers solve the polarization mode dispersion and polarization instability shortcomings of standard single-mode fibers, the higher cost and optical loss of commercially available PM fibers currently precludes their widespread use in outside plant cables. However, PM fibers find usage in short lengths for connecting optical components and in optical sensors where their higher loss is not a limitation. As mentioned previously, they are also used in some optical devices such as certain types of polarizing beam splitters and combiners.

One example of a polarization splitting and combining device using polarization maintaining fibers is disclosed in U.S. Pat. No. 6,175,668 issued Jan. 16, 2001 and naming Nicholas F. Borrelli et al. as inventors. The disclosed device includes a so-called antipodal phase generator for processing an incident polarized light signal. The antipodal phase generator splits the polarized light into mutually perpendicular polarization components. So-called antipodal signals are created when a first polarization component having a given orientation is phase delayed by an odd multiple of $\pi$ radians with respect to a second polarization component having the same orientation but propagating in the other optical path.

The other polarization components of the light signal are both perpendicular relative to the first and second polarization components and propagate in their respective optical paths while remaining in-phase relative to one another. The disclosed splitting and combining device also includes a coupler that creates a destructive interference between the antipodal signals allowing them to be sent to a first output port while the in-phase polarization components are combined and directed to a second output port.

U.S. Pat. No. 6,175,668 also discloses the herein above described polarization splitting and combining device being used as the basis for an isolator/circulator and a polarization controller. Various embodiments of these optical devices are disclosed, some of which using planar coupler technology while others use fiber coupler technology. All of the disclosed embodiments using fiber coupler technology include optical paths made entirely of polarization maintaining fiber. The polarization maintaining fibers are used both in the phase shifting and signal coupling sections of the devices.

Various methods are disclosed in U.S. Pat. No. 6,175,668 for creating phase delays in the various devices using fiber coupler technology. All of the disclosed methods are based on the use of polarization maintaining fibers extending integrally throughout the entire length of the respective optical paths. In accordance with one of the disclosed methods, the phase delay is created by providing a first and a second polarization maintaining fiber, the fibers being characterized as having different core ellipticities so as to create a relative difference in the length of the corresponding first and second optical paths. In accordance with another disclosed method, the phase shift is created by flexures formed in both integral polarization maintaining fibers.

With regards to the coupling sections of the fiber coupler technology devices disclosed in U.S. Pat. No. 6,175,668, again, they are described as being made out of integral segments of polarization maintaining fibers merging integrally with the polarization maintaining fiber segments responsible for phase shifting of the optical signal. The coupling sections of the fiber technology devices are more specifically disclosed as being of the conventional evanescent-type but using polarization maintaining fiber. Segments of the polarization maintaining fiber are disposed within a glass tube which is heated and collapsed around the fiber segments to form an overclad. The heated device is then drawn to reduce the diameter thereof so as to form the evanescent couplers.

Although somewhat useful, the optical devices disclosed in U.S. Pat. No. 6,175,668 suffer from numerous important drawbacks. These drawbacks are, at least in part, related to the use of optical paths made entirely of integral polarization maintaining fibers both at the phase shifting and signal coupling sections of the devices.

The idea of using polarization maintaining fibers instead of conventional fibers in the coupling sections may seem theoretically appealing. However, in practice, it leads to various serious potential drawbacks including loss of bandwidth or wavelength dependency and increase manufacturing costs. As is well known in the art, an evanescent-type coupler such as suggested for use in the device disclosed in U.S. Pat. No. 6,175,668 is one in which optical energy is transferred from one optical fiber to the another by virtue of the electric-field overlap between the two cores of the fibers. Since the evanescent field of an optical fiber is an exponentially decaying field, the cores of the two fibers must be brought into close proximity.

In general, evanescent-wave couplers are usually constructed using one of two methods namely etch and twist or asymmetric polish. In these two fabrication methods, the cladding layers of the fibers are preferentially removed by chemical etching or mechanical polishing techniques. The fibers are then placed in contact with one another and carefully aligned to achieve optical coupling.

U.S. Pat. No. 6,175,668 and other publications sometimes refer to fused bi-conical taper couplers as evanescent-wave couplers although theoretically these coupler are not really of the true evanescent type. The fused bi-conical taper couplers wave couplers are fabricated by heating two optical fibers until they coalesce into a composite wave-guiding structure. While the fibers are being heated, they are slowly stretched and tapered. This causes the light in the fiber to spread out far enough into the composite structure where it can be coupled to the other fiber.

Typically, fused optical fiber couplers are attractive for use in optical fiber communication networks because they have low loss, good temperature stability, mechanical rigidity and ease of manufacture. Indeed, conventional couplers made by the familiar technique of fused tapering, exhibit exceptionally low loss, but the coupling ratio depends on the wavelength of light passing through the coupler. Since the wavelength of optical sources can vary over considerable ranges, and since it often is necessary to use more than one optical wavelength in a system, it is highly desirable to use couplers that exhibit reduced sensitivity of coupling ratio to optical wavelength.

Couplers having a nominally constant coupling ratio over the wavelength band of interest are referred to as wideband couplers, wavelength flattened couplers, wavelength independent couplers, broadband couplers, etc. By using couplers that have a sufficient constancy over a sufficient bandwidth, with acceptable excess loss and sufficient constancy in performance with changes in temperature and stress environment, systems can be provided for working over a design range of wavelengths and environmental conditions. It follows that improvement in the constancy of coupling ratio while keeping excess loss within acceptable limits can lead to important improvement in the performance and lower cost for many optical systems.

One method of achieving relatively wideband couplers is to produce the couplers with fibers having different propagation constants. A difference in propagation constant between the fibers may be acquired through various methods. In one approach identical fibers are processed to have different diameters, for example, by drawing one fiber into a tapered section of reduced diameter relative to the other fiber. The tapered section is then fused with an unprocessed fiber or with a fiber that was tapered more or less than the first fiber.

More specifically, the wide wavelength range optical fiber coupler includes a first optical fiber, a portion of which has undergone a preliminary elongation, and a second conventional optical fiber. To form the optical fiber coupler, the initially elongated region of the first optical fiber and a section of the second optical fiber are aligned side by side and mutually thermally fused to form a fused section. The fused section thus formed is then elongated or drawn out to form a fused-elongated region.

By virtue of the above-mentioned preliminary elongation process, it is possible to create a propagation constant difference between the component first and second optical fibers. By so doing, it is possible to increase the mode coupling between the component first and second optical fibers across the fused-elongated region, and thereby attain a desired coupling ratio. Different propagation constants can also be obtained by etching one or both fibers so that their diameters are different before fusion or by selecting fibers with different V numbers.

The use of polarization maintaining fibers in the coupling regions as suggested in U.S. Pat. No. 6,175,668 would, at the very least, potentially greatly increase the complexity of the herein above disclosed manufacturing process used to make relatively wavelength insensitive couplers. Indeed, if polarization maintaining fibers were to be used, the fibers would potentially need to be aligned relative to each other with respect to the polarization axes.

Furthermore, the alignment between the fibers would potentially need to remain intact during the various manufacturing steps including the actual drawing process in the case of evanescent-type couplers The difficulty associated with maintaining the alignment between the fibers would potentially be compounded by the fact that at least one of the fibers would be pre-stretched.

Hence, the use of polarization maintaining fibers in the coupling regions as suggested in U.S. Pat. No. 6,175,668 is associated with numerous drawbacks. The use of polarization maintaining fibers instead of conventional fibers in the coupling sections may lead to a potential loss of bandwidth since conventional methods for producing relatively wavelength independent couplers are not particularly well suited for use with polarization maintaining fibers. Other coupler manufacturing methods may prove to be not only more complex, with consequent potential increases in manufacturing costs and potential loss of reliability, but also less susceptible of producing a relatively wavelength independent coupler.

The use of polarization maintaining fibers instead of conventional fibers throughout both branches of the interferometer as suggested in U.S. Pat. No. 6,175,668 is also associated with potentially serious drawbacks such as loss of bandwidth and/or increased manufacturing complexity. Indeed, in order to produce interferometer branches providing a phase shift with reduced sensitivity to optical wavelength, it is desirable that the phase shift between the phase shifted optical components be as small as possible. Hence, it is desirable that the phase shift has a value of $\pi$ radians. In order to achieve such a result, it is, in turn, desirable that the birefringence differential between the respective birefringence level of the interferometer branches be as high as possible and the branches as short as possible.

Hence, if the sensitivity to optical wavelength in the region of the interferometer of the devices disclosed in U.S. Pat. No. 6,175,668 is taken into consideration, the length of the branches of the interferometer needs to be rigorously controlled and ideally quite small. This imposes yet another difficult manufacturing constraint in the manufacturing process. This additional constraint in itself may prove to be at least partially insurmountable again leading to potential loss in bandwidth.

In short, although U.S. Pat. No. 6,175,668 discloses combining and splitting devices all including a so-called antipodal phase generator that theoretically address some of the other prior art device drawbacks such as loss of bandwidth and overall manufacturing complexity, in practice the disclosed devices, nevertheless, suffer from some of the same drawbacks. The drawbacks associated with combining and splitting devices disclosed in U.S. Pat. No. 6,175,668 are at least in part related to the use of optical paths made entirely of integral polarization maintaining fibers both at the phase shifting and signal coupling sections of the devices. Accordingly, there exists a need for an improved optical coupling and splitting device.

SUMMARY OF THE INVENTION

Advantages of the present invention include that one of the proposed optical devices allows for the splitting of a light signal into two orthogonal linearly polarized signals. The proposed optical device also allows for combining of optical signals by reversing their paths in the device. The proposed optical splitting and combining device is specifically designed so as to reduce the sensitivity of the device to optical wavelength at strategic regions of the device namely both at the coupling and phase shifting regions of the device.

The coupling regions of the proposed device are specifically designed so as to provide the attractive characteristics associated with fused-optical fiber couplers such as low loss, good temperature stability, mechanical rigidity and ease of manufacture. The coupling regions of the proposed device allow for the benefits of these characteristics with the added substantial benefit of being designed so as to be manufacturable through conventional manufacturing processes known to provide an important reduction of sensitivity to bandwidth.

The phase shifting branches of the proposed device are designed so as to provide relatively small phase shift, typically in the range of one $\pi$ radians so as to provide phase shifting branches with reduced sensitivity to optical wavelength. Also, the phase shifting branches of the proposed device are designed so as to provide a relatively small phase shift without imposing difficult manufacturing constraints such as the need for the length of the branches to be quite small and rigorously controlled.

Overall, one of the proposed optical devices is thus specifically designed so as to allow for both signal splitting and combining while providing large bandwidth. The proposed combining and splitting device is also adapted to be inserted into an optical circuitry for providing another optical device, namely an improved optical polarizer offering the same advantages as the proposed optical splitting and combining device when taken in isolation.

In accordance with an embodiment of the invention, there is provided a Mach-Zehnder device for use with an optical signal, the Mach-Zehnder device comprising a device input port and a device output port; a substantially achromatic first coupling region optically connected to the device input port; a substantially achromatic second coupling region optically connected to the device output port; an intermediate region optically connected to both the first and second coupling regions, the intermediate region including a first intermediate branch and a second intermediate branch, the first intermediate branch defining a phase shifting portion, the phase shifting portion defining a phase shifting portion level of birefringence over the length of the phase shifting portion, the phase shifting portion level of birefringence being different then an intermediate branch reference portion level of birefringence prevailing over at least an intermediate branch reference portion part of the remainder of the first intermediate branch. Preferably, the phase shifting portion level of birefringence is different then the level of birefringence of the remainder of the first intermediate branch and the level of birefringence of the second intermediate branch.

Conveniently, the phase shifting portion level of birefringence is higher then the intermediate branch reference portion level of birefringence. Preferably, the phase shifting portion is made out of a phase shifting segment of polarization maintaining fiber. Preferably, the phase shifting segment of polarization maintaining fiber defines a phase shifting segment length, the phase shifting segment length having a value substantially in the range of one half of a beat length.

Conveniently, the first and second coupling regions are made of first and second fibers fused together, the first and second fibers having different propagation constant about the first and second coupling regions so as to define a coupling region propagation constant differential. Preferably, the propagation constant differential results from a difference in diameter between the first and second fibers about the first and second coupling regions.

Preferably, the phase shifting portion defines a phase shifting portion fast polarization axis and the Mach-Zehnder device further includes a polarization orienting means optically connected to the input port for ensuring that when the optical signal reaches the input port, the optical signal is linearly polarized and defines a signal fast polarization axis substantially aligned with the phase shifting portion fast polarization axis. Conveniently, the polarization orienting means includes a polarization orienting segment of polarization maintaining fiber, the polarization orienting segment of polarization maintaining fiber defining a polarization orienting segment fast polarization axis substantially aligned with the phase shifting portion fast polarization axis.

In accordance with one embodiment of the invention, the Mach-Zehnder device comprises a first main fiber, the first main fiber defining a first fiber input segment, the first fiber input segment being optically connected to a first fiber first coupling segment, the first fiber first coupling segment being optically connected to a first intermediate branch, the first intermediate branch being optically connected to a first fiber second coupling segment, the first fiber second coupling segment being optically coupled to a first fiber output segment; a second main fiber, the second main fiber defining a second fiber input segment, the second fiber input segment being optically connected to a second fiber first coupling segment, the second fiber first coupling segment being optically connected to a second intermediate branch, the second intermediate branch being optically connected to a second fiber second coupling segment, the second fiber second coupling segment being optically coupled to a second fiber output segment; the first fiber first coupling segment and the second fiber first coupling segment being optically coupled to one another so as to form a first coupling region; the first fiber second coupling segment and the second fiber second coupling segment being optically coupled to one another so as to form a second coupling region; the first intermediate branch defining a phase shifting portion, the phase shifting portion including a phase shifting segment of polarization maintaining fiber, the phase shifting portion defining a phase shifting portion level of birefringence over the length of the phase shifting portion, the phase shifting portion level of birefringence being different then an intermediate branch reference portion level of birefringence prevailing over at least an intermediate branch reference portion part of the remainder of the first intermediate branch.

The present invention also relates to a method for forming a Mach-Zehnder device using a first and a second main fiber, the Mach-Zehnder device being intended for use with an optical signal splittable into first and second split signals each having respective fast and slow polarization components, the first and second main fibers respectively defining first and second fiber input segments, first and second fiber first coupling segments, first and second fiber intermediate segments, first and second fiber second coupling segments and first and second fiber output segments, the first and second fiber intermediate segments being adapted to respectively transmit first and second split signals, the method comprising the steps of: splicing a phase shifting segment of relatively highly birefringent fiber in the first fiber intermediate segment between the first fiber first and second coupling segments, the phase shifting segment being calibrated so as to create a polarization selective phase shift between fast and slow polarization components of the first split signal; juxtaposing the first fiber first and second coupling segments respectively with the second fiber first and second coupling segments so as to respectively form first and second device coupling regions.

Conveniently, the method further comprises the step of splicing an input segment of relatively highly birefringent fiber to both the first and second fiber input segments, the polarization axes of one of the input segments of relatively highly birefringent fiber being substantially aligned with the polarization axes of the phase shifting segment of relatively highly birefringent fiber and the polarization axes of the other one of the input segments of relatively highly birefringent fiber being substantially perpendicular relative to the polarization axes of the phase shifting segment of relatively highly birefringent fiber.

Preferably, one of the first or second fiber first or second coupling segments is tapered prior to juxtaposition with a corresponding first or second fiber first or second coupling segments so as to create an asymmetry between the juxtaposed segments and allow for the creation of relatively achromatic coupling region.

Conveniently, the method further comprises the step of calibrating the optical properties of the second fiber intermediate segment so that when the second split signal reaches the second coupling region the second split signal is substantially in phase with one of the polarization components of the first split signal.

In accordance with the present invention, there is also provided a phase shifting device for substantially achromatically modifying the phase of a first optical signal relative to the phase of a second optical signal, the first optical signal defining a first signal fast polarization axis and a first signal slow polarization axis, the second optical signal defining a second signal fast polarization axis and a second signal slow polarization axis, the antipodal phase generator comprising: a first optical path having a first birefringence level, the first optical path defining a first path input and a first path output; a second optical path having a second birefringence level substantially similar to the first birefringence level, the second optical path defining a second path input and a second path output; the first optical path being provided with a phase shifting segment made out of a polarization maintaining fiber having a phase shifting birefringence level relatively different then the first and second birefringence levels, the phase shifting segment defining a phase shifting segment fast polarization axis and a phase shifting segment slow polarization axis, the phase shifting segment being calibrated so as to cause a predetermined phase delay between the first signal fast polarization axis and the first signal slow polarization axis so as to defined a delayed and an non-delayed first signal; the second optical path being calibrated so as to propagate the second signal fast polarization axis substantially in phase with the second signal slow polarization axis and with the non-delayed first signal; the difference in birefringence level between the phase shifting birefringence level and the first and second birefringence levels defining a birefringence differential, the birefringence differential being calibrated such that when the first optical signal is propagated in the first optical path and the second optical signal is simultaneously propagated in the second optical path, the birefringence differential creates a polarization selective phase shift between the first optical signal and the second optical signal.

In accordance with the present invention there is still further provided an optical device for transmitting a first optical signal and a second optical signal, the optical device comprising a first optical path, the first optical path defining a first optical path input port and an opposed first optical path output port, the first optical path being provided with a phase shifting segment optically connected between the first optical path input port and the first optical path output port, the phase shifting segment being made out of a polarization maintaining fiber and having a phase shifting birefringence level, the remainder of the first optical path having a reference birefringence level, the phase shifting birefringence level being different then the reference birefringence level; a second optical path, the second optical path defining a second optical path input port and an opposed second optical path output port, the second optical path having a second birefringence level; the difference in birefringence level between the phase shifting birefringence level and the reference birefringence level defining a birefringence differential, the birefringence differential being calibrated such that when the first optical signal is propagated in the first optical path and the second optical signal is simultaneously propagated in the second optical path, the birefringence differential creates a polarization selective phase shift between the first optical signal and the second optical signal.

BRIEF DESCRIPTION OF THE DRAWINGS

Various embodiments of the present invention will now be disclosed, by way of example, in reference to the following drawings in which.

DETAILED DESCRIPTION

Figure 1:
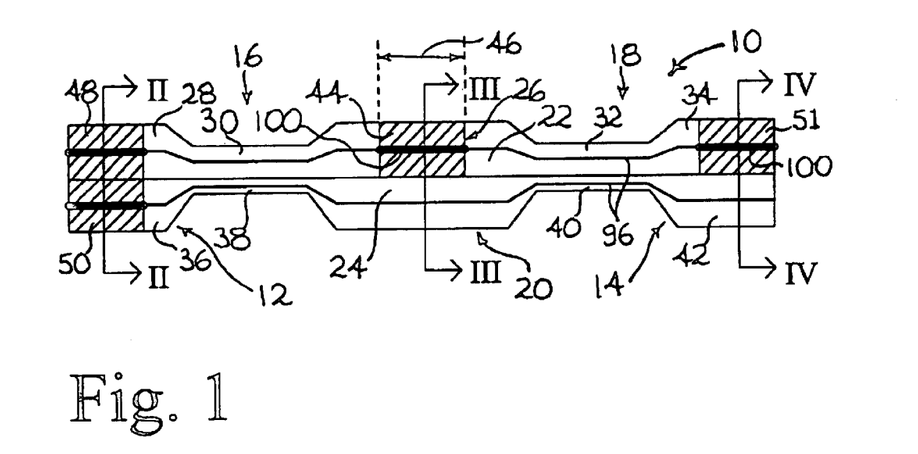
FIG. 1: in a schematic plan view illustrates a Mach Zehnder device in accordance with an embodiment of the present invention.

Referring to FIG. 1, there is shown in a schematic view a Mach-Zehnder device 10 in accordance with an embodiment of the present invention. The Mach-Zehnder device 10 defines an input port 12 and an opposed output port 14. The device 10 also defines a first coupling region 16 optically connected to the input port 12 and a second coupling region 18 optically connected to the output port 14.

The device 10 further defines an intermediate region 20 optically connected to both the first and second coupling regions 16, 18. The intermediate region 20 includes a first intermediate branch 22 and a second intermediate branch 24.

It should be understood that the intermediate region 20 could be used, independently of the remainder of the Mach-Zehnder device 10, as an independent phase shifting device without departing from the scope of the present invention. In other words, although the intermediate region 20 is, by way of example, hereinafter mostly described as being incorporated into a Mach-Zehnder device, the intermediate region 20 could be used alone or in combination with other components without departing from the scope of the present invention.

Regardless of the context of usage, the first intermediate branch 22 defines a phase shifting portion 26. In the various figures, the phase shifting portion 26 is illustrated as being substantially centrally located relative to the first intermediate branch 22 thus defining a pair of non-shifting or remainder segments substantially symmetrically disposed on each side of the phase shifting portion 26.

It should, however, be understood that the phase shifting portion 26 could be otherwise located along the first intermediate branch 22 and may even extent substantially across the entire length of the first intermediate branch 22 from the first coupling region 16 to the second coupling region 18. Regardless of the positioning of the phase shifting portion 26 along the first intermediate branch 22, the sections of the first intermediate branch 22 other than the phase shifting portion are hereinafter referred to as the remainder of the first intermediate branch 22.

The phase shifting portion 26 is characterized by a predetermined phase shifting portion level of birefringence prevailing therealong. The phase shifting portion level of birefringence is calibrated so as to be different than a predetermined so-called intermediate branch reference portion level of birefringence prevailing over at least a predetermined intermediate branch reference portion part of the remainder of the first intermediate branch 22.

More specifically, in situations wherein the level of birefringence varies across the remainder of the first intermediate branch 22, it may be desirable to define an intermediate branch reference portion, to characterize its intermediate branch reference portion level of birefringence and to calibrate the phase shifting portion level of birefringence so that it is different than the intermediate branch reference portion level of birefringence. In a preferred embodiment of the invention, the phase shifting portion level of birefringence is calibrated so as to be different than the level of birefringence prevailing over the remainder of the first intermediate branch 22 and the second intermediate branch 24.

The difference in birefringence level between the phase shifting portion level of birefringence and the intermediate branch reference portion level of birefringence defines a so-called birefringence differential. As will be seen hereinafter in greater detail, the birefringence differential is preferably calibrated so as to create a polarization selective phase shift between optical signals propagating in the first and second intermediate branches 22, 24.

Typically, the birefringence differential is created by calibrating the phase shifting portion level of birefringence at a higher value than the value of the intermediate branch reference portion level of birefringence. However, in some situations, it may be desirable to have the birefringence differential created by calibrating the phase shifting portion level of birefringence at a lower value then the value of the intermediate branch reference portion level of birefringence.

Preferably, the device 10 is an all fiber device including a first and a second main fiber. The first main fiber defines a first fiber input segment 28 optically connected to a first fiber first coupling segment 30. The first fiber coupling segment 30 is, in turn, optically connected to the first intermediate branch 22. The first intermediate branch 22 is optically connected to a first fiber second coupling segment 32 and, the first fiber second coupling segment 32 is optically connected to a first fiber output segment 34.

Preferably, the first fiber input segment 28, the first fiber first coupling segment 30 and the first intermediate branch 22 extend integrally from an integral strip of fiber. Similarly, preferably, the first intermediate branch 22, the first fiber second coupling segment 32 and the first fiber output segment 34 extend from an integral strip of optical fiber. Alternatively, the various fiber segments could be spliced to each other.

Similarly, the second main fiber defines a second fiber input segment 36 optically connected to a second fiber first coupling segment 38. The second fiber first coupling segment 38 is, in turn, optically connected to the second intermediate branch 24. The second intermediate branch 24 is optically connected to a second fiber second coupling segment 40 and the second fiber second coupling segment 40 is optically coupled to a second fiber output segment 42. Again, the various second fiber segments could extend integrally from an integral strip of optical fiber or be spliced in various combinations with each other.

In a preferred embodiment of the invention, the first and second main fibers are made out of conventional single-mode fiber while the phase shifting portion is made out of a phase shifting segment 44 of polarization maintaining fiber having a level of birefringence higher than the level of birefringence of the single-mode fiber from which the first and second main fibers are made. Alternatively, the phase shifting portion 26 could be made out of the phase shifting segment 44 of low birefringence fiber having a level of birefringence lower than the level of birefringence of the single-mode fiber from which the first and second main fibers are made.

The phase shifting segment 44 of polarization maintaining fiber defines a phase shifting segment length 46. The phase shifting segment length 46 is typically calibrated so that the phase shift occurs over a length having a value substantially in the range one half of a beat length. As is well known in the art, a beat length is defined as the length over which two distinct optical signals each having a distinct state of polarization accumulate a $2\pi$ phase shift. The beat length is typically inversely proportional to the level of birefringence of the fiber, and directly proportional to the operating wavelength. Typically, although by no means exclusively, the phase shifting segment length has a value substantially in the range of 10 microns to a few centimeters.

Typically, either one of the first and second coupling regions 16, 18 and preferably both the first and second coupling regions 16, 18 are substantially achromatic so as to provide a generally wavelength independent coupling between the first and second main fibers. Typically, the first fiber first coupling segment 30 and the second fiber first coupling segment 38 are optically coupled to one another so as to form the first coupling region 16. Similarly, the first fiber second coupling segment 32 and the second fiber second coupling segment 40 are optically coupled to one another so as to form the second coupling region 18.

The first and second coupling regions 16, 18 are preferably made by having the first and second main fibers fused together. The first and second main fibers are preferably fused together since it is generally considered that so-called fused-taper couplers are more stable from the point of view of polarization stability. It should however be understood that couplers other then fused-taper couplers could be used without departing from the scope of the present invention.

In order to achieve a substantially achromatic coupling between the first and second main fibers about the first and second coupling regions 16, 18, the first and second main fibers preferably have a different propagation constant about the first and second coupling regions 16 and 18 so as to define a so-called coupling region propagation constant differential therebetween. In other words, in at least one of the first or second coupling regions 16 or 18 or preferably in both the first and second coupling regions 16 and 18 the first and second main fibers have different propagation constant so as to define a propagation constant differential.

Typically, the propagation constant differential results from a difference in diameter between the first and second main fiber about the first and second coupling regions 16, 18. It should also be understood that the propagation differential could result from other asymmetrical features such as preferential etching or the like between the first and second main fibers in the first and second coupling regions 16, 18 without departing from the scope of the present invention.

The phase shifting segment 44 defines a phase shifting polarization maintaining fiber fast polarization axis. Preferably, the Mach Zehnder device 10 further includes a polarization orienting means optically connected to the input port 12 for insuring that when an optical signal reaches the input port 12 it is linearly polarized and defines a signal fast polarization axis having a predetermined angular relationship relative to the phase shifting portion fast polarization axis.

Typically, the polarization orientation means include at least one and preferably two polarization orienting segments of polarization maintaining fiber 48, 50 spliced respectively to the first and second fiber input segments, 28, 36. Typically, one of the polarization orienting segments of polarization maintaining fiber 48 or 50 defines a polarization orienting segment fast polarization axis that is substantially aligned with the phase shifting portion fast polarization axis while the other polarization orienting segment of polarization maintaining fiber 48 or 50 defines a polarization orienting segment fast polarization axis substantially perpendicular relative to the phase shifting portion fast polarization axis.

Preferably, the Mach Zehnder device 10 further includes a polarization maintaining means optically connected to the output port 14 for insuring that the polarization of the signal leaving the device 10 is maintained. Typically, the polarization maintaining means include at least one polarization maintaining segment of polarization maintaining fiber 51 spliced to the first or second fiber output segments, 34 or 42.

Figure 2:
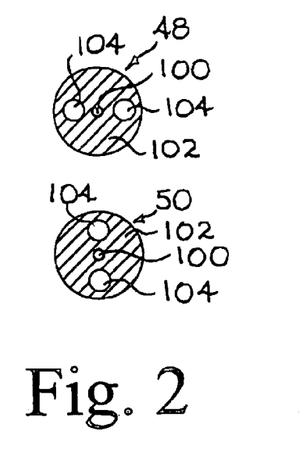
FIG. 2: in a transversal cross-sectional view taken along arrows II—II of FIG. 1 illustrates the cross-sectional configuration of a polarization orienting segment part of the Mach Zehnder device in accordance with an embodiment of the present invention.
Figure 3:
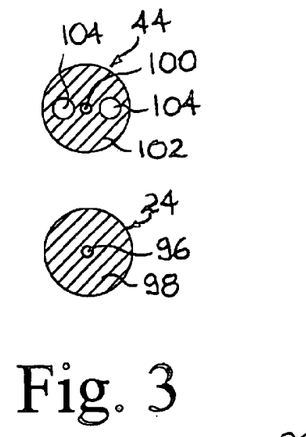
FIG. 3: in a transversal cross-sectional view taken along arrows III—III of FIG. 1 illustrates the cross-sectional configuration of a phase shifting segment and of a second intermediate branch both part of the Mach Zehnder device in accordance with an embodiment of the present invention.
Figure 4:
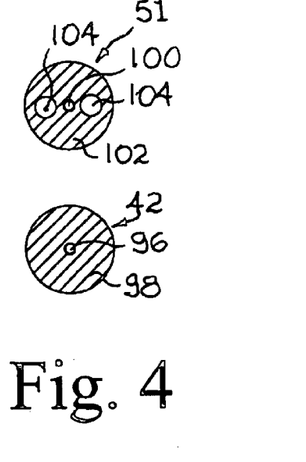
FIG. 4: in a transversal cross-sectional view taken along arrows IV—IV of FIG. 1 illustrates the cross-sectional configuration of a polarization maintaining segment part of the Mach Zehnder device in accordance with an embodiment of the present invention.
Figure 5:
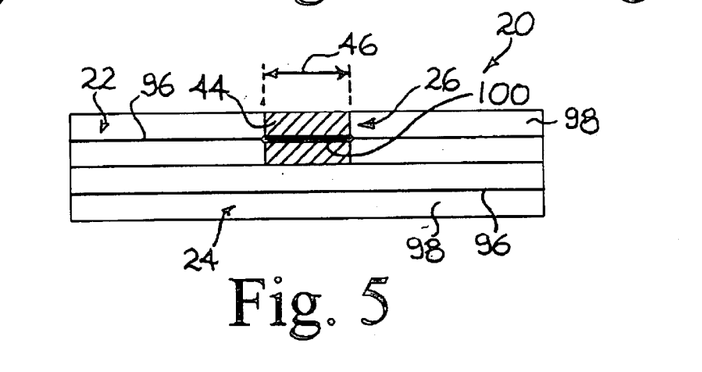
FIG. 5: in a schematic plan view illustrates a phase shifting optical device in accordance with an embodiment of the present invention.

As shown more specifically in FIGS. 2 through 4, the first and second main fibers each define a conventional single-mode fiber core 96 and a conventional single-mode fiber cladding 98. Similarly, the phase shifting segment 44, the polarization orienting segments of polarization maintaining fiber 48, 50 and the polarization maintaining segment of polarization maintaining fiber 51 all define a conventional polarization maintaining fiber core 100, a conventional polarization maintaining fiber cladding 102 and conventional polarization maintaining stress rods 104. It should be noted that the polarization maintaining stress rods 104 could be otherwise positioned such as orthogonally shifted relative to the positioning shown in FIG. 5, without departing from the scope of the present invention.

In use, the Mach Zehnder device 10 operates under the same principal as a conventional Mach Zehnder interferometer. The device 10 is thus adapted to initially split an optical wave into two waves using a first coupling or splitting region, delay the two waves relative to one another in the two intermediate branch segment and recombine them using the other coupling region. Depending on the delay between the two waves various interference patterns may occur. One of the characteristics of the device 10 is that the phase shift is selectively performed on a predetermined polarization component of a signal passively propagating in one of the branches.

Figure 6:
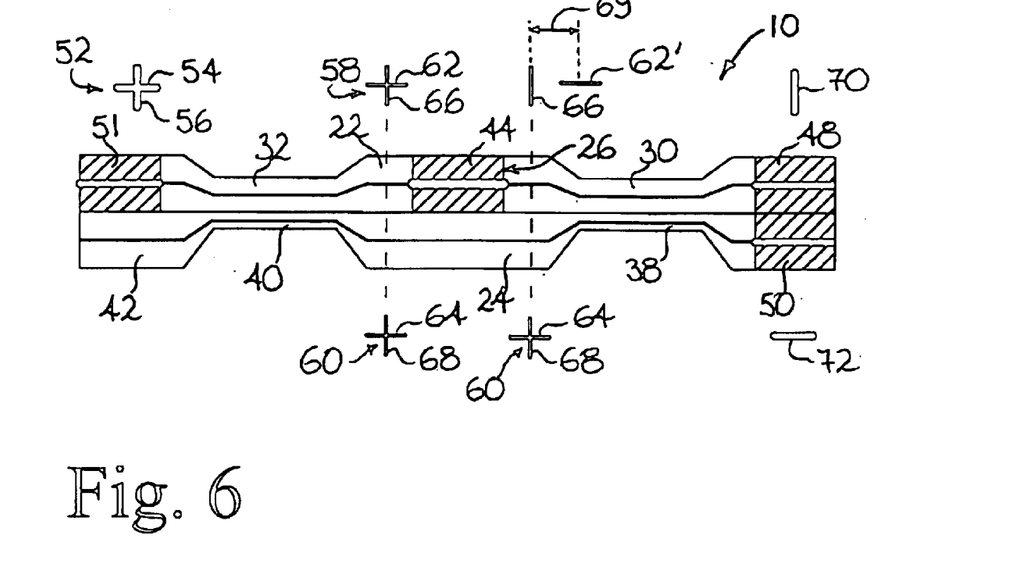
FIG. 6: in a schematic plan view illustrates a Mach Zehnder device in accordance with an embodiment of the present invention being used as an optical wave splitter.

As with some other types of polarization splitting and combining device, the device 10 may be used selectively either as a splitter or a combiner by selecting the direction of propagation of the optical signal within the device. As shown in FIG. 6, when the device 10 is used as a splitter, a randomly polarized light signal 52 is directed into the input port 12. The randomly polarized light signal 52 includes orthogonal fast and slow polarization components schematically represented respectively by the symbols 54 and 56.

Typically, the randomly polarized light signal 52 is directed into either one or both the first and second fiber input segments 28, 36. The polarized light signal 52 is split by the first coupling region 16 into first and second split signals 58, 60 that are allowed to passively propagate respectively into the first and second intermediate branches 22, 24. The first coupling region 16 typically splits the randomly polarized light signal 52 in 50—50 ratio so that the split signals 58, 60 of substantially equal intensity passively propagate respectively in the first and second intermediate branches 22, 24. The first and second split signals 58, 60 respectively defines corresponding orthogonal first and second split signal fast polarization components 62, 64 and first and second split signal slow polarization components 66, 68.

When the split signal 58 reaches the phase shifting portion 26, the change in the level of birefringence referred to as the birefringence differential creates a polarization selective phase shift between either the first split signal fast or slow polarization components 62 or 66 and respectively either the corresponding second split signal fast or slow polarization components 64 or 68. Depending on the orientation of the phase shifting segment fast polarization axis either the first split signal fast or slow polarization component 62, 66 will be phased shifted. By way of example only, in FIG. 6, the first split signal fast polarization component 62 is phase shifted by a phase shifting length 69 and becomes phase shifted first split signal slow polarization component 62'.

The optical characteristic of the phase shifting portion 26 are preferably calibrated so that the phase shifting length 69 has a value $\pi$ radians relative to the corresponding second split signal fast or second polarization component 64, 68 propagating in the second intermediate branch 24. Alternatively the optical characteristic of the phase shifting portion 26 could be calibrated so that the phase shifting length 69 is an odd number of $\pi$ radians.

As is well known in the art of conventional fiber Mach-Zehnder devices, the interference between the signals of two branches that are phase shifted by an even number of $\pi$ radians will output in one of the output fibers while the interference between the signals of two branches that are phase shifted by an odd number of $\pi$ radians will output at the other output fiber. The second coupling region 18 acts as the interference region for the two split signals 58, 60. When the split signal polarization components that are phased shifted an odd number of $\pi$ radians relative to one another, namely either the first and second split signal fast polarization components 62, 64 or the first and second split signal slow polarization components 66, 68, are coupled they perfectly interfere with each other and the resulting interference combination 70 is directed towards the first fiber output port 28. Conversely, the split signal polarization components that are phased shifted by an even number of $\pi$ radians relative to one another are coupled by the second coupling region 18 so as to perfectly interfere with each other and the resulting orthogonally opposite interference combination 72 is directed towards the second fiber output port 36.

In general terms, the present invention includes an antipodal phase generator comprising the first and second intermediate branches 22, 24 and the phase shifting portion 26 incorporated into the first intermediate branch 22. The first intermediate branch 22 is adapted passively to propagate a first branch-first polarization state component and a first branch-second polarization state component, the first polarization state component being directed out of the optical device 10 via the first output.

The second intermediate branch 24 is adapted passively to propagate a second branch-first polarization state component substantially in phase with the first branch-first polarization state component and a second branch-second polarization state component delayed by substantially an odd multiple of π radians with respect to the first branch-second polarization state component. The second polarization state component being directed out of the optical device via the second output. Also, the phase shifting portion 26 has a polarization section length, a polarization section parallel polarization constant and an orthogonal polarization constant that causes the second polarization component to be phase shifted by a given number of π radians and the first polarization component to phase shift the same number of π radians plus or minus an odd number of π radians.

Figure 7:
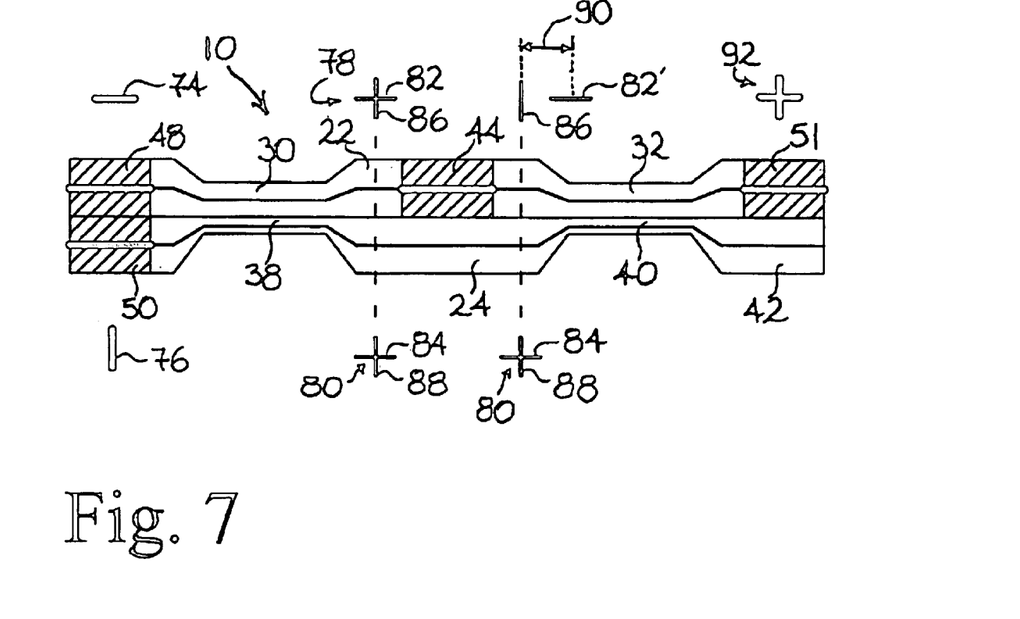
FIG. 7: in a schematic plan view illustrates a Mach Zehnder device in accordance with an embodiment of the present invention being used as an optical wave combiner.

As mentioned previously, one of ordinary skill in the art will recognize that the optical device 10 is bi-directional and operates in reverse fashion from what is hereinabove described with respect to the splitter when the device 10 is used as a combiner. As shown in FIG. 7, orthogonal polarized light signals 74, 76 are directed respectively into the first and second fiber input port segments 28, 36 by the first and second polarization orienting segments of polarization maintaining fiber 48, 50.

Splitting into split signals 78, 80 occurs at the first coupling region 16. The first and second split signal 78, 80 respectively defines corresponding orthogonal first and second split signal fast polarization components 82, 84 and first and second split signal slow polarization components 86, 88.

Polarization selective phase shift 90 then occurs at the phase shifting segment 44 creating a phase shifted first split signal polarization component 86' or 88'. Complete constructive interference eventually occurs at the second coupling region 18 allowing a polarized light signal 92 having an intensity combining that of the orthogonal polarized light signals 74, 76 to appear at one of the output segments 34 or 42.

Figure 9:
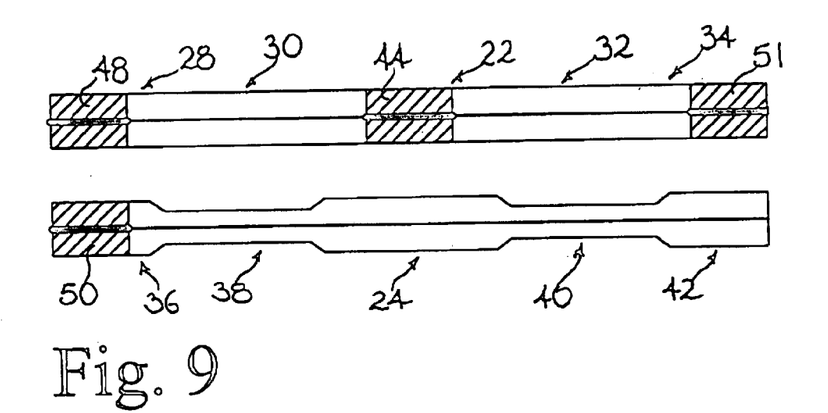
FIG. 9: in a schematic plan view illustrates a coupler pre-streching step part of a manufacturing process also in accordance with an embodiment of the present invention.
Figure 10:
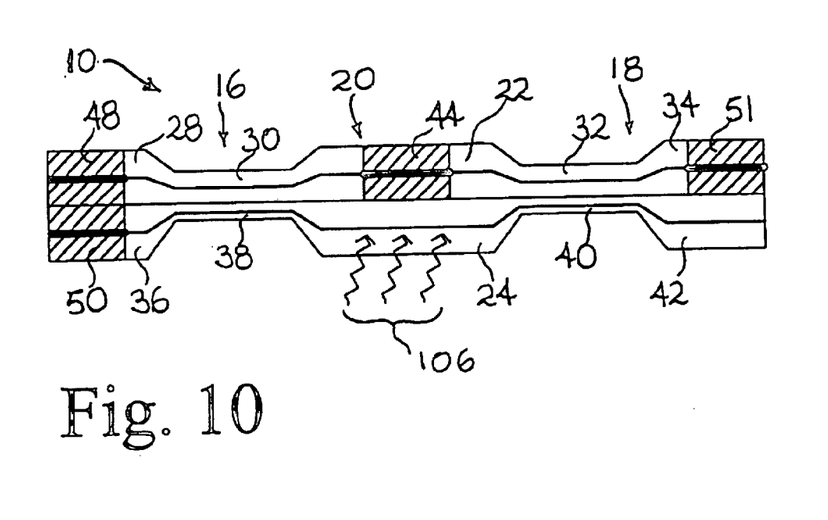
FIG. 10: in a schematic plan view illustrates schematically the phase tuning step part of a manufacturing process in accordance with the present invention.

The present invention also relates to a method for forming a Mach Zehnder device such as the Mach Zehnder device 10 hereinabove disclosed. Some of the steps involved in the method in accordance with the present invention for forming the Mach Zehnder device 10 are schematically illustrated in FIGS. 8 through 10.

Figure 8:
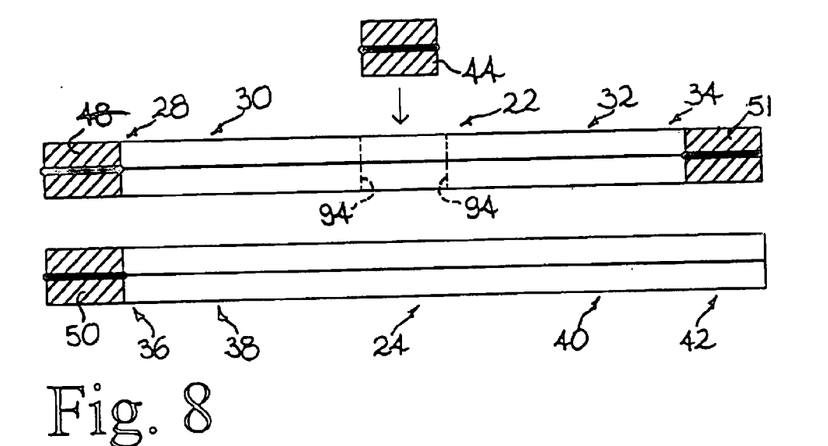
FIG. 8: in a schematic plan view illustrates alignment and splicing steps part of a manufacturing process also in accordance with an embodiment of the present invention.

As shown in FIG. 8, the method includes the step of splicing the phase shifting segment 44 of a relative highly birefringent fiber to adjacent splicing ends 94 of the first fiber intermediate segment 22 between the first fiber first and second coupling segments 30, 32. The phase shifting segment 44 of relatively highly birefringent fiber is calibrated so as to create a polarization selective phase shift between orthogonally polarized components of the first split signal propagating in the first intermediate branch 22.

As mentioned previously, the phase shifting segment 44 of relatively highly birefringent fiber is preferably made out of a polarization maintaining fiber. Preferably, the phase shifting segment 44 of relatively highly birefringent fiber is of the circular SAP type, or the PANDA fiber. As is well known, one advantage of the PANDA fiber over most other fiber types is that the fiber core size and numerical aperture is compatible with regular single-mode fiber. This ensures minimum losses in devices using both types of fibers. It should however be understood that other types of relatively highly birefringent fiber or low birefringence fiber could be used without departing from the scope of the invention.

When a polarization orienting means is used, the first and second polarization orienting segments of polarization maintaining fibers 48, 50 are also spliced respectively to the first and second fiber input segments 28, 36. During splicing of the first and second polarization orienting segments of polarization maintaining fibers 48, 50, care is taken so as to align one of the polarization orienting segment of polarization maintaining fibers 48 or 50 with the phase shifting portion fast polarization axis while the other polarization orienting segment of polarization maintaining fiber 48 or 50 is aligned so that its polarization orienting segment fast polarization axis is substantially perpendicular with the phase shifting portion fast polarization axis.

Another step involved in the manufacturing of the Mach Zehnder device 10 being also illustrated in FIG. 9 is the alignment of the first and second main fibers so that the first and second fiber first coupling segments 30, 38 and the first and second fiber second coupling segments 32, 40 are substantially aligned respectively with each other.

The next step involves juxtaposing the first fiber first and second coupling segments 30, 32 respectively with the second fiber first and second coupling segments 38, 40 so as to respectively form the first and second device coupling regions 16, 18. When the first and second coupling regions 16, 18 are of the so-called fused type the first and second fiber first coupling segments 30, 38 and the first and second fiber second coupling segments 38, 40 are respectively drawn and fused together using conventional drawing and fusion techniques. One method of achieving relatively wideband couplers is to produce the first and second coupling regions 16, 18 with fibers having different propagation constants.

A difference in propagation constant between the fibers may be acquired through various methods. Preferably identical fibers are processed to have different diameters, for example, by drawing one fiber into a tapered section of reduced diameter relative to the other fiber. The tapered section is then fused with an unprocessed fiber or with a fiber that was tapered more or less than the first fiber.

FIG. 10, the second fiber first and second coupling segments 38, 40 have undergone a preliminary elongation. To form the first and second coupling regions 16, 18, the pre-stretched segments are aligned side by side correspondingly with the first fiber first and second coupling segments 30, 32 before being mutually thermally fused to form fused first and second coupling sections 16, 18.

The fused first and second coupling sections 16, 18 thus formed are then elongated or drawn out to form fused-elongated coupling sections 16, 18. Different propagation constants could also be obtained by etching one or both fibers so that their diameters are different before fusion or by selecting fibers with different V numbers or by any other suitable means without departing from the scope of the present invention.

Once the first and second coupling regions 16, 18 have been formed, the propagation constant in the second fiber intermediate segment 24 is adjusted so as to ensure that the optical signal propagating in the second fiber intermediate segment 24 is substantially in phase with one of the polarization components propagating in the first fiber intermediate segment 22.

Again, the propagation constant in the second fiber intermediate segment 24 may be adjusted through various methods. One of these methods involves the use of ultraviolet illumination as indicated schematically by arrows 106. The device 10 is then preferably annealed at a predetermined temperature for a predetermined amount of time.

What is claimed is:

1. A Mach-Zehnder device for use with an optical signal, said Mach-Zehnder device comprising:

a device input port and a device output port;

a substantially achromatic first coupling region optically connected to said device input port;

a substantially achromatic second coupling region optically connected to said device output port; an intermediate region optically connected to both said first and second coupling regions, said intermediate region including a first intermediate branch and a second intermediate branch, said first intermediate branch defining a phase shifting portion, said phase shifting portion defining a phase shifting portion level of birefringence over the length of said phase shifting portion, said phase shifting portion level of birefringence being different than an intermediate branch reference portion level of birefringence prevailing over at least an intermediate branch reference portion part of the remainder of said first intermediate branch, so as to allow for the splitting of the optical signal into two orthogonal linearly polarized signals.

2. A Mach-Zehnder device as recited in claim 1 wherein said phase shifting portion level of birefringence is different than the level of birefringence of the remainder of said first intermediate branch.

3. A Mach-Zehnder device as recited in claim 2 wherein said phase shifting portion level of birefringence is different than the level of birefringence of said second intermediate branch.

4. A Mach-Zehnder device as recited in claim 1 wherein said phase shifting portion level of birefringence is higher than said intermediate branch reference portion level of birefringence.

5. A Mach-Zehnder device as recited in claim 4 wherein said phase shifting portion is made out of a phase shifting segment of polarization maintaining fiber.

6. A Mach-Zehnder device as recited in claim 5 wherein said phase shifting segment of polarization maintaining fiber defines a phase shifting segment length, said phase shifting segment length having a value substantially in the range of one half of a beat length.

7. A Mach-Zehnder device as recited in claim 1 wherein said first and second coupling regions consist of first and second fibers fused together, said first and second fibers having different propagation constant about said first and second coupling regions so as to define a coupling region propagation constant differential.

8. A Mach-Zehnder device as recited in claim 7 wherein said propagation constant differential results from a difference in diameter between said first and second fibers about said first and second coupling regions.

9. A Mach-Zehnder device as recited in claim 1 wherein
said phase shifting portion defines a phase shifting portion fast polarization axis;
said Mach-Zehnder device further including a polarization orienting means optically connected to said input port for ensuring that when said optical signal reaches said input port, said optical signal is linearly polarized and defines a signal fast polarization axis substantially aligned with said phase shifting portion fast polarization axis.

10. A Mach-Zehnder device as recited in claim 9 wherein said polarization orienting means includes a polarization orienting segment of polarization maintaining fiber, said polarization orienting segment of polarization maintaining fiber defining a polarization orienting segment fast polarization axis substantially aligned with said phase shifting portion fast polarization axis.

11. A Mach-Zehnder device for use with an optical signal, said Mach-Zehnder device comprising:
a first main fiber, said first main fiber defining a first fiber input segment, said first fiber input segment being optically connected to a first fiber first coupling segment, said first fiber first coupling segment being optically connected to a first intermediate branch, said first intermediate branch being optically connected to a first fiber second coupling segment, said first fiber second coupling segment being optically coupled to a first fiber output segment;
a second main fiber, said second main fiber defining a second fiber input segment, said second fiber input segment being optically connected to a second fiber first coupling segment, said second fiber first coupling segment being optically connected to a second intermediate branch, said second intermediate branch being optically connected to a second fiber second coupling segment, said second fiber second coupling segment being optically coupled to a second fiber output segment; said first fiber first coupling segment and said second fiber first coupling segment being optically coupled to one another so as to form a first coupling region said first fiber second coupling segment and said second fiber second coupling segment being optically coupled to one another so as to form a second coupling region; said first intermediate branch defining a phase shifting portion, said phase shifting portion including a phase shifting segment of polarization maintaining fiber, said phase shifting portion defining a phase shifting portion level of birefringence over the length of said phase shifting portion, said phase shifting portion level of birefringence being different than an intermediate branch reference portion level of birefringence prevailing over at least an intermediate branch reference portion part of the remainder of said first intermediate branch, so as to allow for the splitting of the optical signal into two orthogonal linearly polarized signals.

12. A Mach-Zehnder device as recited in claim 11 wherein said phase shifting segment of polarization maintaining fiber defines a phase shifting segment length, said phase shifting segment length having a value substantially in the range of one half of a beat length.

13. A Mach-Zehnder device as recited in claim 11 wherein said first and second fibers consist of fibers fused together about one of said first or second coupling regions.

14. A Mach-Zehnder device as recited in claim 11 wherein either one of said first or second coupling regions is substantially achromatic.

15. A Mach-Zehnder device as recited in claim 11 wherein said second main fiber and a remaining segment of said first main fiber other then than said phase shifting segment are made of a single mode fiber.

16. A method for forming a Mach-Zehnder device using a first and a second main fiber, said Mach-Zehnder device being intended for use with an optical signal splittable into first and second split signals each having respective fast and slow polarization components, said first and second main fibers respectively defining first and second fiber input segments, first and second fiber first coupling segments, first and second fiber intermediate segments, first and second fiber second coupling segments and first and second fiber output segments, said first and second fiber intermediate segments being adapted to respectively transmit first and second split signals, said method comprising the steps of:
splicing a phase shifting segment of relatively highly birefringent fiber in said first fiber intermediate segment between said first fiber first and second coupling segments, said phase shifting segment being calibrated so as to create a polarization selective phase shift between fast and slow polarization components of said first split signal;

juxtaposing said first fiber first and second coupling segments respectively with said second fiber first and second coupling segments so as to respectively form first and second device coupling regions.

17. A method as recited in claim 16 further comprising the step of splicing an input segment of relatively highly birefringent fiber to one of said first or second fiber input segments, the polarization axes of said input segment of relatively highly birefringent fiber being substantially aligned with the polarization axes of said phase shifting segment of relatively highly birefringent fiber.

18. A method as recited in claim 16 further comprising the step of splicing an input segment of relatively highly birefringent fiber to both said first and second fiber input segments, the polarization axes of one of said input segments of relatively highly birefringent fiber being substantially aligned with the polarization axes of said phase shifting segment of relatively highly birefringent fiber and the polarization axes of the other one of said input segments of relatively highly birefringent fiber being substantially perpendicular relative to the polarization axes of said phase shifting segment of relatively highly birefringent fiber.

19. A method as recited in claim 16 further comprising the step of splicing an output segment of relatively highly birefringent fiber to one of said first or second fiber output segments, the polarization axes of said output segment of relatively highly birefringent fiber being substantially aligned with the polarization axes of said phase shifting segment of relatively highly birefringent fiber.

20. A method as recited in claim 16 further comprising the step of fusing together and drawing the juxtaposed first and second first coupling segments so as to form fused-drawn first and second device coupling regions.

21. A method as recited in claim 16 wherein one of said first or second fiber first or second coupling segments is tapered prior to juxtaposition with a corresponding first or second fiber first or second coupling segments so as to create an asymmetry between the juxtaposed segments and allow for the creation of relatively achromatic coupling region.

22. A method as recited in claim 16 further comprising the step of calibrating the optical properties of said second fiber intermediate segment so that when said second split signal reaches said second coupling region said second split signal is substantially in phase with one of the polarization components of said first split signal.

23. A method as recited in claim 22 wherein the optical properties of said second fiber intermediate segment are calibrated by an Ultra-Violet syntonisation process.

24. A phase shifting device for substantially achromatically modifying the phase of a first optical signal relative to the phase of a second optical signal, said first optical signal defining a first signal fast polarization axis and a first signal slow polarization axis, said second optical signal defining a second signal fast polarization axis and a second signal slow polarization axis, said phase shifting device comprising a first optical path having a first birefringence level, said first optical path defining a first path input and a first path output;

a second optical path having a second birefringence level substantially similar to said first birefringence level, said second optical path defining a second path input and a second path output;

said first optical path being provided with a phase shifting segment made out of a polarization maintaining fiber having a phase shifting birefringence level relatively different than said first and second birefringence levels, said phase shifting segment defining a phase shifting segment fast polarization axis and a phase shifting segment slow polarization axis, said phase shifting segment being calibrated so as to cause a predetermined phase delay between said first signal fast polarization axis and said first signal slow polarization axis so as to defined a delayed and an non-delayed first signal;

said second optical path being calibrated so as to propagate said second signal fast polarization axis substantially in phase with said second signal slow polarization axis and with said non-delayed first signal the difference in birefringence level between said phase shifting birefringence level and said first and second birefringence levels defining a birefringence differential, said birefringence differential being calibrated such that when said first optical signal is propagated in said first optical path and said second optical signal is simultaneously propagated in said second optical path, said birefringence differential creates a polarization selective phase shift between said first optical signal and said second optical signal.

25. An antipodal phase generator as recited in claim 24 wherein said phase shifting segment is calibrated so that said phase delay occurs over one half of a beat length.

26. An antipodal phase generator as recited in claim 24 further composing a polarization alignment means optically connected to said first optical path intermediate said first path input and said phase shifting segment for substantially aligning said first signal fast polarization axis and said first signal slow polarization axis respectively with said phase shifting segment fast polarization axis and said phase shifting segment slow polarization axis.

27. An optical device for transmitting a first optical signal and a second optical signal, said optical device comprising:

a first optical path, said first optical path defining a first optical path input port and an opposed first optical path output port, said first optical path being provided with a phase shifting segment optically connected between said first optical path input port and said first optical path output port, said phase shifting segment being made out of a polarization maintaining fiber and having a phase shifting birefringence level, the remainder of said first optical path having a reference birefringence level, said phase shifting birefringence level being different then than said reference birefringence level;

a second optical path, said second optical path defining a second optical path input port and an opposed second optical path output port, said second optical path having a second birefringence level;

the difference in birefringence level between said phase shifting birefringence level and said reference birefringence level defining a birefringence differential, said birefringence differential being calibrated such that when said first optical signal is propagated in said first optical path and said second optical signal is simultaneously propagated in said second optical path, said birefringence differential creates a polarization selective phase shift between said first optical signal and said second optical signal.

* * * * *